United States Patent
Oh et al.

(10) Patent No.: US 11,891,306 B2
(45) Date of Patent: Feb. 6, 2024

(54) METHOD FOR PRODUCING SILICA AEROGEL BLANKET BY REUSING SUPERCRITICAL WASTE LIQUID

(71) Applicant: LG CHEM, LTD., Seoul (KR)

(72) Inventors: Kyoung Shil Oh, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 203 days.

(21) Appl. No.: 16/753,921

(22) PCT Filed: Aug. 21, 2018

(86) PCT No.: PCT/KR2018/009618
§ 371 (c)(1),
(2) Date: Apr. 6, 2020

(87) PCT Pub. No.: WO2019/098504
PCT Pub. Date: May 23, 2019

(65) Prior Publication Data
US 2020/0331766 A1    Oct. 22, 2020

(30) Foreign Application Priority Data

Nov. 17, 2017 (KR) .................. 10-2017-0154144

(51) Int. Cl.
*C01B 33/158* (2006.01)
(52) U.S. Cl.
CPC .................. *C01B 33/1585* (2013.01)
(58) Field of Classification Search
CPC .................................. C01B 33/1585
See application file for complete search history.

(56) References Cited

U.S. PATENT DOCUMENTS 6,670,402 B1    12/2003  Lee et al.
10,160,655 B2   12/2018  Xiang
(Continued)

FOREIGN PATENT DOCUMENTS

CN    1382070 A    11/2002
CN    104496402 A   4/2015
(Continued)

OTHER PUBLICATIONS

Takahama (JP-3283057-B2), Google Patents machine translation (Year: 1991).*

(Continued)

*Primary Examiner* — Colin W. Slifka
*Assistant Examiner* — Michael Forrest
(74) *Attorney, Agent, or Firm* — Morgan, Lewis & Bockius LLP

(57) ABSTRACT

Provided is a method for producing a silica aerogel blanket, the method comprising recovering and reusing a supercritical waste liquid generated after a supercritical drying process. Without putting in additional equipment investments or energy, supercritical waste liquid recovered after a supercritical drying process can be reused by lowering the content of ammonium ions ($NH_4^+$) present therein through a simple adjustment of the conditions for the supercritical drying process. Thus, it is possible to produce a silica aerogel blanket while reducing the production costs thereof and preventing the deterioration of thermal insulation performance of the silica aerogel blanket.

13 Claims, 2 Drawing Sheets

(56) References Cited

U.S. PATENT DOCUMENTS

| | | | |
|---|---|---|---|
| 11,142,463 B2 * | 10/2021 | Kim | ............... C01B 33/158 |
| 2004/0087670 A1 | 5/2004 | Lee et al. | |
| 2016/0046495 A1 | 2/2016 | Xiang | |
| 2018/0010726 A1 | 1/2018 | Kim et al. | |
| 2018/0099873 A1 | 4/2018 | Kim et al. | |
| 2018/0264793 A1 | 9/2018 | Kim et al. | |
| 2019/0107242 A1 | 4/2019 | Kim et al. | |
| 2019/0152788 A1 | 5/2019 | Xiang | |

FOREIGN PATENT DOCUMENTS

| | | |
|---|---|---|
| CN | 205145937 | 4/2016 |
| CN | 107208355 A | 9/2017 |
| JP | H0549910 A | 3/1993 |
| JP | H11335115 | 12/1999 |
| JP | 2001072408 | 3/2001 |
| JP | 3273957 | 4/2002 |
| JP | 2003512277 A | 4/2003 |
| JP | 2003176108 A | 6/2003 |
| JP | 2005334871 A | 12/2005 |
| JP | 2011190548 | 9/2011 |
| JP | 2016508476 A | 3/2016 |
| JP | 2017081764 A | 5/2017 |
| JP | 2018537311 A | 12/2018 |
| JP | 2018538224 A | 12/2018 |
| KR | 10-20020062287 | 7/2002 |
| KR | 10-1434273 | 8/2014 |
| KR | 10-20170086830 | 7/2017 |
| KR | 20170086831 A | 7/2017 |
| KR | 10-20170096928 | 8/2017 |
| KR | 20170104914 A | 9/2017 |
| WO | 01-28675 | 4/2001 |
| WO | 2015-175970 | 11/2015 |
| WO | 2016/167494 A1 | 10/2016 |
| WO | WO-2016167494 A1 * | 10/2016 ........... C01B 33/141 |
| WO | 2017/155311 A1 | 9/2017 |

OTHER PUBLICATIONS

Office Action for corresponding Japanese Application No. 2020-506733 dated Mar. 4, 2021, 5 pages.

Office Action dated Aug. 8, 2022, issued in corresponding Chinese Patent Application 201880063231.3.

* cited by examiner

US 11,891,306 B2

METHOD FOR PRODUCING SILICA AEROGEL BLANKET BY REUSING SUPERCRITICAL WASTE LIQUID

CROSS-REFERENCE TO RELATED APPLICATIONS

This application is a National Stage Application of International Application No. PCT/KR2018/009618 filed on Aug. 21, 2018, which claims the benefit of Korean Patent Application No. 10-2017-0154144, filed on Nov. 17, 2017, in the Korean Intellectual Property Office, the disclosure of which is incorporated herein in its entirety by reference.

TECHNICAL FIELD

The present invention relates to a method for producing a silica aerogel blanket by reusing supercritical waste liquid.

BACKGROUND

Aerogel is a highly porous material composed of nanoparticles, and has high porosity, specific surface area, and low thermal conductivity, thereby attracting attention as a thermal insulation material, a soundproofing material and the like of high efficiency. However, since the aerogel has very low mechanical strength due to the porous structure thereof, aerogel composites in which aerogel is bonded to a fibrous blanket by being impregnated therewith are being developed. For example, a blanket containing silica aerogel using silica aerogel is prepared through steps of silica sol preparation-gelation-aging-surface modification-drying. Specifically, in a typical technology, a small amount of $NH_4OH$ is used in the aging step and hexamethyl disilazane (HMDS) is used as a surface modifier. At this time, when HMDS is decomposed into trimethyl silanol (TMS) or trimethyl ethoxy silanol (TMES), $NH_3$ is generated. Some of $NH_3$ is reacted with carbon dioxide during supercritical drying and forms ammonium carbonate salt, and some thereof remains in recovered ethanol.

Meanwhile, the aerogel blanket is not widely used in the market despite the superior thermal insulation performance thereof when compared with typical thermal insulation materials because the production cost thereof is high. Product prices of an aerogel blanket are relatively higher than those of other thermal insulation materials due to the expensive raw materials, the complex production processes, and the costs of processing a large amount of waste liquid generated during the production process thereof.

Methods of reducing costs by changing raw materials or changing production processes among the above price increase factors can directly affect the quality of products, thereby not appropriate to be applied. The easiest way to lower costs is to reuse waste liquid generated during a production process.

However, reusing the waste liquid can cause the following problems: first, the physical properties of an aerogel blanket can be deteriorated (increase in thermal conductivity) due to residual $NH_4^+$; second, it is difficult to control the gelation time of a precursor solution; and third, ammonium carbonate salt formed by reacting with carbon dioxide used in supercritical drying can block pipes of supercritical drying equipment.

In order to solve the problems, there are methods using distillation, an ion exchange resin, or neutralization titration. However, such methods require putting in additional equipment investments and energy. Therefore, the present invention is to propose a method capable of reusing supercritical waste liquid without putting in additional equipment investments and energy.

PRIOR ART DOCUMENT (Patent Document 1) CN 205145937 U

BRIEF DESCRIPTION

Technical Problem

An aspect of the present invention provides a method for producing a silica aerogel blanket, the method capable of reducing the production costs and preventing the deterioration in thermal insulation performance of the silica aerogel blanket by reusing supercritical waste liquid generated after a supercritical drying process.

Specifically, the present invention is to reuse supercritical waste liquid in producing the next batch of silica aerogel blanket by lowering the content of ammonium ions ($NH_4^+$) present in the supercritical waste liquid recovered after a supercritical drying process, through a simple adjustment of the conditions for the supercritical drying process instead of putting in additional equipment investments and energy.

Technical Solution

According to an aspect of the present invention, there is provided a method for producing a silica aerogel blanket, the method characterized by performing a supercritical drying process by setting an injection temperature of $CO_2$ which is injected into an extractor containing silica wet gel to 0-30° C., recovering a supercritical waste liquid after the supercritical drying; and reusing the recovered supercritical waste liquid recovered after the supercritical drying process.

Advantageous Effects

According to the method for producing a silica aerogel blanket of the present invention, it is possible to produce a silica aerogel blanket while reducing the production costs and preventing the deterioration of thermal insulation performance thereof.

In addition, the method for producing a silica aerogel blanket of the present invention is simple and economical since supercritical waste liquid can be reused without putting in additional equipment investments or energy.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

DETAILED DESCRIPTION

Figure 1:
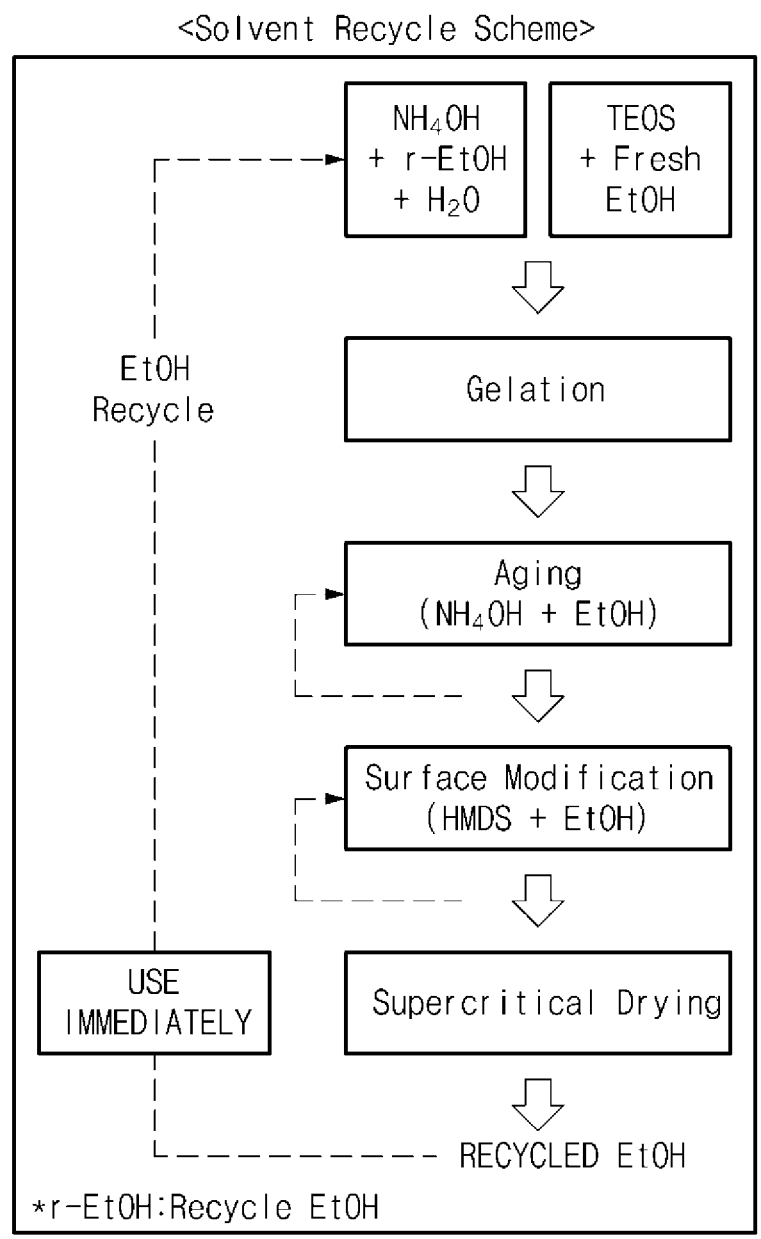
FIG. 1 is a schematic view showing a method for producing silica aerogel by reusing supercritical waste liquid of the present invention.

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor can properly define the meaning of the words or terms to best explain the invention.

Silica aerogel which is widely used as a thermal insulation material in construction or industrial fields has a disadvantage in that when the surface thereof is not hydrophobicized, water in the air is absorbed due to the hydrophilic properties of a silanol group (Si—OH) on the surface of silica, so that the thermal conductivity is gradually increased. Also, there is a problem in that it is difficult to manufacture a super-thermal insulation product having a meso pore since it is difficult to expect a spring back phenomenon due to the intensified pore collapse in a drying process.

Therefore, in order to maintain a low thermal conductivity by suppressing the absorption of moisture in the air, a step of modifying the surface of the silica aerogel so as to be hydrophobic is essentially required. In general, silica aerogel is prepared through steps of silica precursor solution preparation-gelation-aging-surface modification-supercritical drying.

Meanwhile, a surface modifier used in the surface modification step forms ammonium ions ($NH_4^+$) during a hydrophobic process of the surface of silica aerogel. Therefore, when waste liquid is reused without having the ammonium ions removed therefrom, the pH of a silica sol solution is increased due to the ammonium ions present in the waster liquid, making it difficult to control gelation time, thereby making it impossible to produce a product having desired physical properties. Furthermore, the ammonium ions can block pipes of supercritical drying equipment by forming ammonium carbonate salt by reacting with carbon dioxide in the supercritical drying step, and some thereof can remain in the supercritical waste liquid to cause problems such as increasing the thermal conductivity of a finally produced silica aerogel or silica aerogel blanket.

Therefore, in order to reduce the production costs of the silica aerogel blanket and prevent the deterioration in thermal insulation performance of a final product, it is essential to remove residual ammonium ions present in the supercritical waste liquid before reusing the supercritical waste liquid.

However, typical recycling methods for removing ammonium ions ($NH_4^+$) by means of post treatment after recovering the supercritical waste liquid require putting in additional equipment investments and energy, and thus are not suitable for achieving the purpose of the present invention which is to reduce production costs. Therefore, the present invention is to provide a more effective method for producing a silica aerogel blanket while reducing the production costs and preventing the deterioration of thermal insulation performance of the silica aerogel blanket since supercritical waste liquid can be reused by a simple method.

Hereinafter, the method for producing a silica aerogel blanket of the present invention will be described in detail.

The method for producing a silica aerogel blanket of the present invention is characterized by performing a supercritical drying process by setting the injection temperature of $CO_2$ which is injected into an extractor containing silica wet gel to 0-30° C., and reusing supercritical waste liquid recovered after the supercritical drying process.

The supercritical waste liquid of the present invention refers to waste liquid generated after supercritical drying, and can contain water, an organic solvent, and ammonium ions ($NH_4^+$). The organic solvent can be one or more selected from the group consisting of methanol, ethanol, hexane, pentane, and isopropanol, more specifically can be ethanol.

Meanwhile, the supercritical waste liquid of the present invention can be obtained by simultaneously applying a plurality of pressure pulses to one or more of a solvent and a supercritical fluid contained in silica gel in the supercritical drying step.

At least two of the plurality of pressure pulses are characterized by having at least one feature of different frequencies and different amplitudes, so that it is possible to rapidly exchange the solvent contained in the silica gel with the supercritical fluid so as to rapidly obtain the supercritical waste fluid, thereby greatly shortening the production time of a silica aerogel blanket.

Typically, supercritical waste liquid is recycled and reused by methods such as distillation, or neutralization by adding an ion exchange resin or acid. The method using distillation or an ion exchange resin requires investments in additional equipment and equipment operational costs so that economic feasibility and processibility are not good. The method using neutralization has a disadvantage in that the safety is deteriorated due to an intense neutralization reaction and neutralization heat, and the corrosion of pipes and mechanical devices occurs due to the use of acid.

Accordingly, the method for producing silica aerogel of the present invention attempts to solve the typical problems by reducing the content of ammonium ions present in the recovered supercritical waste liquid by a simple, stable, and economical method of controlling the conditions of the supercritical drying process.

When a supercritical drying process is performed by injecting $CO_2$ at a relatively lower temperature of 0-30° C., specifically 10-30° C., more specifically 10-20° C. when compared with a typical case in which $CO_2$ is heat treated at a high temperature of 70° C. and injected, the reactivity between the $CO_2$ and ammonium ions in an extractor in which the supercritical drying is performed is increased, thereby inducing the formation of ammonium carbonate salt. As a result, supercritical waste liquid having a low ammonium ion content can be recovered.

When $CO_2$ is injected at a temperature lower than the above range, excessive energy can be consumed for cooling the $CO_2$. When $CO_2$ is injected at a temperature higher than the above range, the formation reaction of ammonium carbonate salt may not be well induced, resulting in production of an excessive amount of ammonium ions present in the recovered supercritical waste liquid to such a degree that the recovered supercritical waste liquid is not suitable to be reused.

Meanwhile, according to the present invention, the injection pressure of the $CO_2$ can be 50-70 bar, more specifically 60-70 bar. When the injection pressure of the $CO_2$ is lower than the above range, $CO_2$ can have a vapor/liquid phase interface formed therein, thereby not uniformly diffused into a blanket. When the injection pressure of the $CO_2$ is higher than the above range, the pressure can be excessively increased when the temperature is raised in the following supercritical drying process.

In addition, the present invention is characterized by performing supercritical drying at a temperature lower than in typical cases. Specifically, the supercritical drying can be performed at 40-90° C., more specifically 40-70° C. When performed at a temperature lower than the above range, the diffusion of the $CO_2$ into aerogel pores is deteriorated, thereby reducing drying efficiency and delaying drying time. When performed at a temperature higher than the above range, generated ammonium carbonate is decomposed, thereby generating $NH_4^+$ ions.

By performing a supercritical drying process under specific conditions as mentioned above, supercritical waste liquid recovered after the supercritical drying process of the present invention can have a small content of ammonium ions. The amount of ammonium ions present in the recovered supercritical waste liquid of the present invention can be 200 mg/kg or less, specifically 150 mg/kg or less, more specifically 120 mg/kg or less. In the case in which the ammonium ions are present in the above range, when reusing the recovered supercritical waste liquid, it is possible to prevent the physical properties of a silica aerogel from being deteriorated.

The supercritical waste liquid having a reduced content of ammonium ions can be reused in preparing the next batch of silica aerogel blanket, specifically in one or more steps selected from the group consisting of gelation catalyst solution preparation, aging, and surface modification, more specifically in the gelation catalyst solution preparation.

Reusing the recovered supercritical waste liquid in preparing silica sol is not desirable in that since a trace amount of ammonium ions remaining in the recovered supercritical waste liquid promotes a gelation reaction so that it may be difficult to control and adjust gelation time.

The present invention is capable of reducing the content of ammonium ions in supercritical waste liquid to a minimum by controlling conditions of a supercritical drying process. However, since a trace amount of ammonium ions can be present, when the supercritical waste liquid is reused in preparing a gelation catalyst solution, not silica sol, there is an advantage in that the inhibition of gelation time control and adjustment by the trace amount of ammonium ions can be prevented.

In addition, the method for producing a silica aerogel blanket of the present invention can further include a step of recycling aged waste liquid and surface-modified waste liquid during the preparation process of a silica aerogel blanket, and reusing the same in one or more steps of the aging step and the surface modification step.

In other words, aged waste liquid and surface-modified waste liquid recovered through the aging step and the surface modification step can also be recovered so as to be reused during a process of producing the next batch of silica aerogel blanket, and can be specifically reused in one or more steps of the aging step and the surface modification step. The aged waste solution and the surface-modified waste solution reused in the aging step and the surface modification step do not cause the deterioration in thermal insulation performance of the silica aerogel blanket even though a large amount of ammonium ions are included therein, and thus can be used without separate processing, thereby further reducing production costs.

However, the aged waste solution and the surface-modified waste solution to be reused cover only about 70 wt % based on the total weight of the organic solvent used in producing the silica aerogel blanket. Therefore, the purpose of the present invention is to obtain an organic solvent having reduced content of ammonium ions from supercritical waste liquid by controlling conditions of a supercritical drying process and reuses the same in preparing a gelation catalyst solution, thereby reducing the amount of organic solvent used for the first time in producing a silica aerogel blanket to reduce the production costs as much as possible.

Therefore, the amount of the supercritical waste liquid to be reused is 70-95 wt % based on the total weight of the organic solvent used in producing the silica aerogel blanket, specifically 70-90 wt %, more specifically 80-90 wt %.

When reused less than the above range, the effect of reducing production costs may not be significant, and when reused greater than the above range, there may be a problem in that the deterioration in physical properties of the silica aerogel blanket is not ensured.

Meanwhile, in the preparation of a gelation catalyst solution, the recovered supercritical waste liquid of the present invention can be used in an amount of 100 wt % of a solvent required for preparing the gelation catalyst solution.

Meanwhile, the silica aerogel blanket has physical properties equivalent to or similar to those of the silica aerogel blanket of Comparative Example in which only fresh ethanol used for the first time was used.

The silica aerogel blanket produced by the method for producing a silica aerogel blanket of the present invention is capable of exhibiting a thermal insulation performance of a thermal conductivity of 16 mW/mK or less at room temperature (25° C.), which is equivalent to or similar to that of a silica aerogel blanket produced using an organic solvent used for the first time (fresh ethanol).

As such, according to the present invention, without putting in additional equipment investments or energy, supercritical waste liquid recovered after a supercritical drying process can be reused by lowering the amount of ammonium ions ($NH_4^+$) present therein through a simple adjustment of the conditions of a supercritical drying process. Thus, it is possible to produce a silica aerogel blanket while reducing the production costs thereof and preventing the deterioration of thermal insulation performance of the silica aerogel blanket.

Hereinafter, examples of the present invention will be described in detail so that those skilled in the art can easily carry out the present invention. The present invention can, however, be embodied in many different forms and is not limited to the examples set forth herein.

Example 1

(1) Recovery of Waste Liquid

Tetraethylorthosilicate (HTEOS) hydrated to 75% (silica concentration 19-20 wt %), ethanol, and water were mixed in a weight ratio of 1:2.25:0.35 to prepare a silica sol. To the silica sol, a base catalyst solution prepared by mixing ethanol and ammonia water at a weight ratio of 210:1 was added in an amount of 0.44 wt % based on the HTEOS, and then cast on a glass fiber to induce gelation. After the gelation was completed, by being left in an ammonia solution (2-3 vol %) of 80-90% based on the volume of the silica sol at a temperature of 50-70° C. for 1 hour, aging was performed, and then by being left in a hexamethyldisilazane (HMDS) solution (2-10 vol %) of 80-90% based on the volume of the silica sol at a temperature of 50-70° C. for 4 hours, a hydrophobic reaction was performed. Meanwhile, aged waste liquid and surface-modified waste liquid generated in the aging and surface modification steps were stored to be reused.

The surface-modified aerogel blanket roll was placed into an extractor for supercritical drying, and then $CO_2$ was injected at a temperature of 20° C. When the injection of the $CO_2$ was completed, the temperature and the pressure of the extractor were respectively 20° C. and 60 bar. Thereafter, when the temperature was raised to 40° C., the pressure was 150 bar, and supercritical drying was performed at 40° C. and 150 bar. The content of $NH_4^+$ present in the ethanol recovered after the completion of supercritical drying was 90 mg/kg.

(2) Reuse of Waste Liquid

The recovered ethanol was mixed in a catalyst tank at a weight ratio of HTEOS:recycled EtOH:fresh EtOH:$NH_4OH$:H2O=1:2.15:0.34:0.018:0.12 to prepare a gelation catalyst solution. Partially hydrated TEOS and fresh ethanol were mixed in a precursor tank at a weight ratio of 1:0.41 to prepare silica sol. The silica sol and a catalyst solution were mixed and impregnated into a glass fiber, and then left for 10 minutes to perform gelation. Finally, a wet gel composite was formed. The wet gel composite was aged at 50-70° C. for 1 hour in the stored aged waste liquid to which only ammonia water was added. The aged wet gel composite was surface-modified at 50-70° C. for 4 hours in the stored surface modified waste liquid to which only hexamethyld-isilazane (HMDS) was added. At this time, the ratio of reused solvent to the total weight of organic solvent required for producing a silica aerogel blanket was 90 wt %.

Thereafter, the surface-modified wet gel was subjected to supercritical drying at 40° C. and 150 bar for 6 hours using $CO_2$ after injecting the $CO_2$ at 20° C., which are the same as the conditions of the supercritical drying.

Examples 2 to 4

A silica aerogel blanket was produced in the same manner as in Example 1 except that supercritical drying was performed under the temperature conditions ($CO_2$ injection temperature, supercritical drying temperature) listed in Table 1 below.

Comparative Example 1

A silica aerogel blanket was produced in the same manner as in Example 1 except that only fresh ethanol was used instead of reusing recovered supercritical waste liquid.

Comparative Example 2

A silica aerogel blanket was produced in the same manner as in Example 1 except that the $CO_2$ injection temperature was 40° C. during supercritical drying.

Comparative Examples 3 to 5

A silica aerogel blanket was produced in the same manner as in Example 1 except that the $CO_2$ injection temperature and the supercritical drying temperature were set as the temperatures listed in Table 1 below.

Experimental Example 1

The amount of $NH_4^+$ present in the supercritical waste liquid recovered in Examples and Comparative Examples, and the physical properties of each silica aerogel blanket produced by reusing the supercritical waste liquid recovered in Examples and Comparative Examples were measured, and the results are shown in Table 1 below.

1) The amount of $NH_4^+$ present in the recovered supercritical waste liquid (mg/kg)

The amount of $NH_4^+$ present in the supercritical waste liquid recovered in the Examples and Comparative Examples was analyzed by ion chromatography.

2) Thickness and room temperature thermal conductivity (mW/mK, 25° C.)

The thickness and room temperature thermal conductivity of the silica aerogel blanket produced by reusing the supercritical waste liquid recovered in Examples and Comparative Examples were measured using HFM 436 Lambda of NETZSCH Co.

TABLE 1

| | Supercritical drying conditions | | Amount of NH4+ present in | | | Room |
|---|---|---|---|---|---|---|
| | injection temperature of $CO_2$ (° C.) | Supercritical drying temperature (° C.) | recovered supercritical waste liquid (mg/kg) | Reused amount (wt %) | Thickness (mm) | temperature thermal conductivity (mW/mK) |
| Example 1 | 20 | 40 | 90 | 90 | 11.2 | 18.2 |
| Example 2 | 20 | 50 | 100 | 90 | 10.9 | 18.5 |
| Example 3 | 20 | 60 | 115 | 90 | 11.0 | 18.6 |
| Example 4 | 20 | 70 | 120 | 90 | 11.1 | 18.6 |
| Comparative Example 1 | 20 | 40 | — | — | 11.3 | 18.5 |
| Comparative Example 2 | 40 | 40 | 230 | 90 | 10.0 | 19.5 |
| Comparative Example 3 | 50 | 50 | 245 | 90 | 11.2 | 19.8 |
| Comparative Example 4 | 60 | 60 | 530 | 90 | 11.0 | 20.3 |
| Comparative Example 5 | 70 | 70 | 750 | 90 | 11.1 | 20.7 |

As shown in Table 1, when comparing Examples 1 to 4 with Comparative Example 1, the silica aerogel blankets of Examples in which supercritical waste liquid was reused according to the present invention have a room temperature thermal conductivity equivalent to or similar to that of the silica aerogel blanket of Comparative Example in which only fresh ethanol was used instead of reusing the supercritical waste liquid. Accordingly, it can be seen that when the supercritical waste liquid is reused according to the present invention, it is possible to reduce the production costs and prevent the deterioration in the thermal insulation performance of the silica aerogel blanket.

Meanwhile, when comparing Examples 1 to 4 with Comparative Examples 2 to 5, it can be confirmed that the supercritical waste liquid of Examples recovered after performing supercritical drying by controlling the $CO_2$ injection temperature to be low contains less ammonium ions than the supercritical waste liquid of Comparative Examples recovered after performing supercritical drying by injecting $CO_2$ at a higher temperature than in Examples.

In addition, when comparing thermal conductivity, it can be confirmed that the silica aerogel blankets of Examples have excellent thermal insulation performance when compared with those of Comparative Examples.

Accordingly, it can be seen that when waste liquid is recovered and reused according to the present invention, it is possible to reduce the production costs and prevent the deterioration in thermal insulation performance of a silica aerogel blanket.

Experimental Example 2

Figure 2:
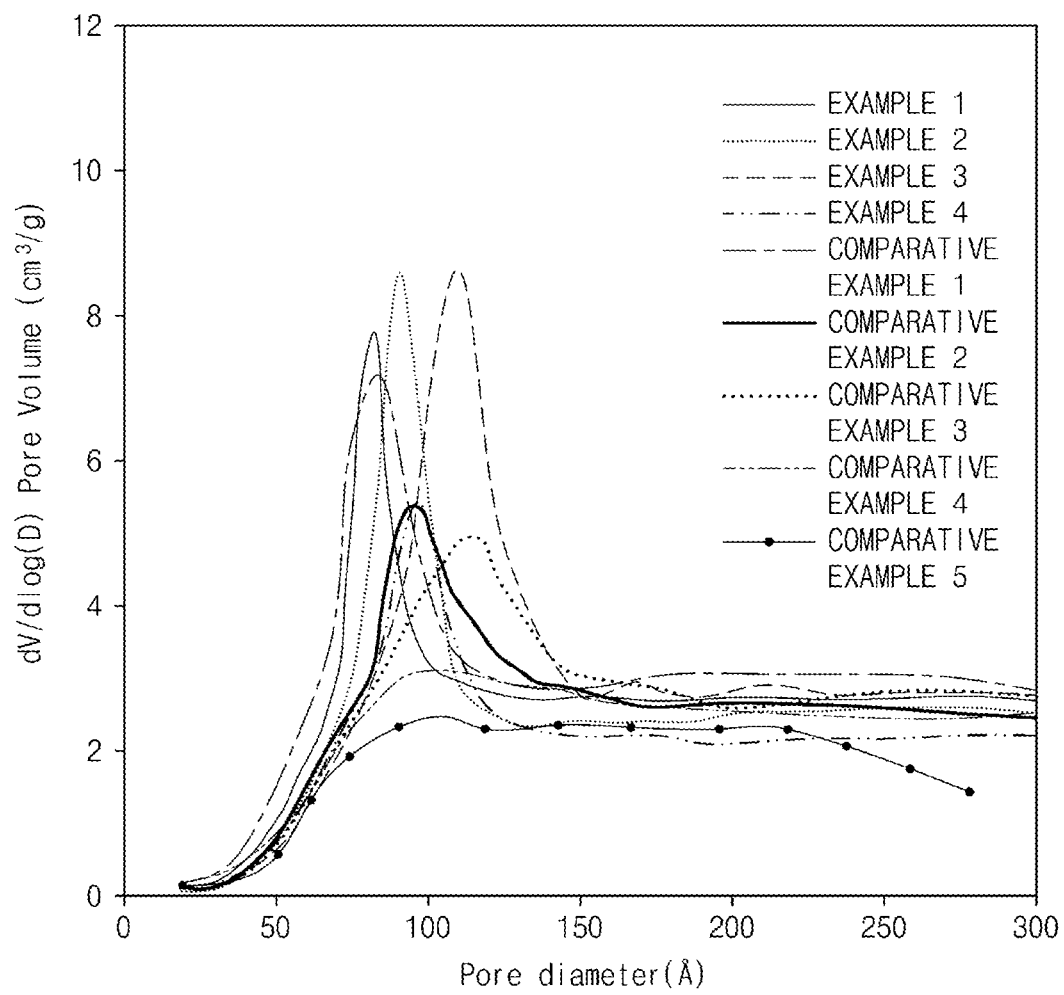
FIG. 2 is a graph showing the pore size distribution according to the conditions of supercritical drying process of Examples and Comparative Examples.

The pore size distribution of aerogel present in the silica aerogel blankets produced by reusing supercritical waste liquid recovered in Examples and Comparative Examples was measured using a BET equipment (Micromeritics 3 Flex), and the results are shown in FIG. 2.

As shown in FIG. 2, in the cases of Examples in which supercritical waste liquid recovered after performing supercritical drying by controlling the $CO_2$ injection temperature to be low, the pore size of the formed aerogel was uniform when compared with that of Comparative Examples in which supercritical waste liquid recovered after performing supercritical drying by heat treating $CO_2$ and injecting the same at a high temperature.

The foregoing description of the present invention has been presented for purposes of illustration. It will be understood by those skilled in the art that various changes in form and details can be made therein without departing from the spirit and scope of the invention. It is therefore to be understood that the above-described embodiments are illustrative in all aspects and not restrictive.

The invention claimed is:

1. A method for producing a silica aerogel blanket, the method comprising:
performing supercritical drying by setting an injection temperature of $CO_2$ which is injected into an extractor containing silica wet gel to 0-30° C., wherein an injection pressure of $CO_2$ is 60-70 bar;
recovering a supercritical waste liquid after the supercritical drying, wherein ammonium ions present in the recovered supercritical waste liquid is 200 mg/kg or less; and
reusing the recovered supercritical waste liquid in one or more steps selected from the group consisting of gelation catalyst solution preparation, aging, and surface modification, wherein an amount of the recovered supercritical waste liquid to be reused is 70-95 wt % based on a total weight of an organic solvent used in producing the silica aerogel blanket.

2. The method of claim 1, wherein the supercritical waste liquid contains water, the organic solvent, and ammonium ions $NH_4^+$.

3. The method of claim 2, wherein
the organic solvent is one or more selected from the group consisting of methanol, ethanol, hexane, pentane, and isopropanol.

4. The method of claim 1, wherein
the injection temperature of $CO_2$ is 10-30° C.

5. The method of claim 1, wherein
the supercritical drying is performed at a temperature of 40-90° C. after injecting the $CO_2$.

6. The method of claim 1, wherein
the supercritical waste liquid is obtained by simultaneously applying a plurality of pressure pulses to one or more of a solvent and a supercritical fluid contained in the silica wet gel in the supercritical drying step, and at least two of the plurality of pressure pulses have one or more features of different frequencies and different amplitudes.

7. The method of claim 1, wherein
the recovered supercritical waste liquid is reused in the gelation catalyst solution preparation.

8. The method of claim 1, further comprising
recovering an aged waste liquid and a surface-modified waste liquid during a process of producing the silica aerogel blanket that includes aging and surface modification, and reusing the same in one or more steps of the aging step and the surface modification step. less.

9. The method of claim 1, wherein
the silica aerogel blanket has a room temperature thermal conductivity of 19 mW/mK or less.

10. The method of claim 1, wherein
the ammonium ions are present in the recovered supercritical waste liquid at from 90 mg/kg to 200 mg/kg.

11. The method of claim 1, wherein
the injection temperature of $CO_2$ is 20-30° C.

12. The method of claim 1, wherein
a surface of the silica aerogel blanket is hydrophobic.

13. The method of claim 1, wherein
the silica aerogel blanket has a room temperature thermal conductivity of 18.2 mW/mK to 19 mW/mK.

* * * * *